Aug. 6, 1957     P. L. HOUSEHOLDER     2,801,883
AUTOMATIC WHEEL BALANCER
Filed Dec. 28, 1953

PAUL L. HOUSEHOLDER,
INVENTOR.

BY Lynn H. Latta

ATTORNEY.

United States Patent Office 2,801,883
Patented Aug. 6, 1957

2,801,883

AUTOMATIC WHEEL BALANCER

Paul L. Householder, Los Angeles, Calif.

Application December 28, 1953, Serial No. 400,535

5 Claims. (Cl. 301—5)

This invention relates to mechanism for balancing wheels, such as the wheels of automotive vehicles, in a manner to inhibit vibration caused by unbalanced centrifugal forces.

A specific object is to provide such a mechanism including a centrifugal force responsive element which is automatically adjustable to compensate for any imbalance existing in the remainder of the wheel structure.

Another object is to provide a mechanism of the character outlined above, which is adapted to be attached to a wheel and to remain attached during operation of the vehicle.

A further object is to provide such a mechanism which, when attached, becomes merged with the lines of the wheel, presents a symmetrical effect, does not protrude to any undesirable degree, and is therefore not objectionable as a permanent part of the wheel structure.

A further object is to provide such an apparatus, wherein the construction is of relatively moderate cost, practical for production manufacture, and readily applied to a wheel structure, with a "snap-on" action.

Other objects will become apparent in the ensuing specifications and appended drawings in which.

Figure 1:
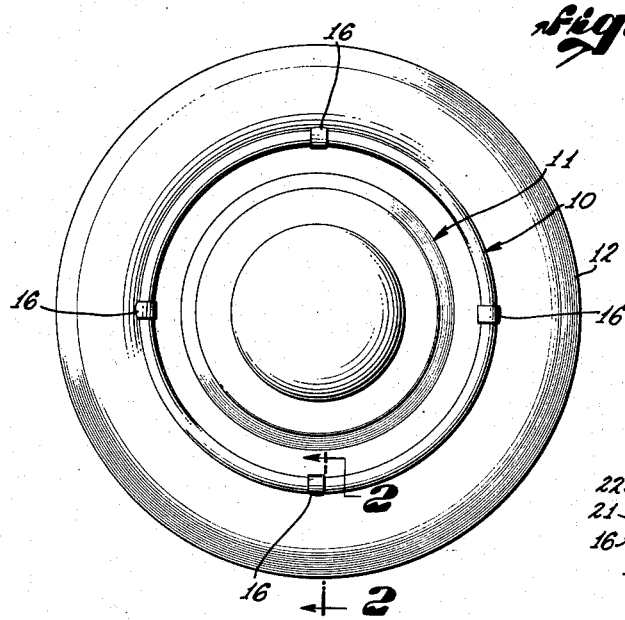
Fig. 1 is a side view of a wheel and tire assembly with my improved balancing mechanism attached thereto.

Referring now to the drawing in detail, I have shown in the drawings, as an example of one form in which the invention may be embodied, a balancer device, indicated generally by the numeral 10, installed on and forming part of an automobile wheel 11, a tire 12 being shown mounted on the rim of the wheel 11.

Figure 2:
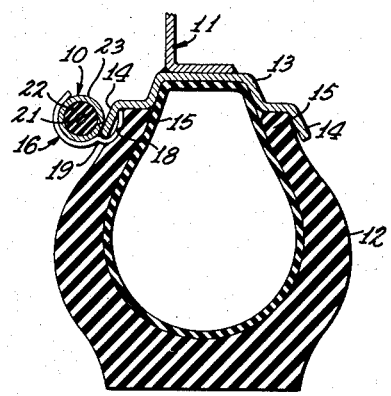
Fig. 2 is a radial sectional view of the same taken on the line 2—2 of Fig. 1.
Figure 3:
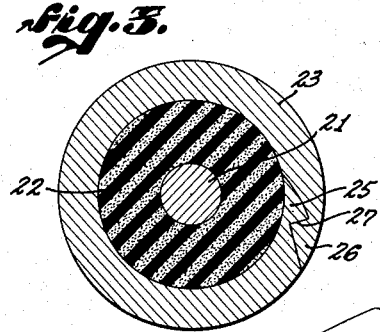
Fig. 3 is an enlarged radial sectional view of the balancing mechanism.

Referring now to Fig. 2, the wheel rim, indicated generally at 13, includes side flanges 14 which embrace the bead 15 of the tire 12. The balancing apparatus includes a series of clips, indicated generally at 16, which provide the means for attaching the balancer apparatus 10 to the wheel structure. Specifically, each of the clips 16 includes a finger 18 which is inserted between the bead 15 and an adjacent flange 14 (preferably while the tire 12 is under-inflated) and is then clamped securely against the inner wall of bead 15 by the pressure of bead 15 when the tire is fully inflated. An offset 19 between finger 18 and the body of clip 16 engages the edge of flange 14 of the wheel rim to locate the balancer attachment in a centered relation to the axis of rotation of the wheel and tire. Due to the compressibility of the rubber in the side wall of tire 12, finger 18 becomes partially embedded in the side wall, and the sidewall rubber, radially outwardly of finger 18, is bulged outwardly partially around offset 19, to provide firm support such as to effectively resist any outward displacement of clip 16 under the effect of centrifugal force when the wheel and tire assembly are rotating at high speed.

The balancer structure 10 comprises a centrifugal force responsive compensating ring 21, which preferably is of a relatively heavy metal so as to have adequate weight; a tubular cushion sleeve 22 in the form of a continuous circular torus, snugly enclosing the compensating ring 21, and a tubular metal sheath 23, also of circular toroidal form enclosing the sleeve 22. Sheath 23 is mounted against one side of rim 13, in coaxial relation to the wheel, 11 by means of a plurality of the clips 16 (Figs. 1 and 2).

Cushion sleeve 22 is of sponge rubber or material of equivalent easy yieldability and resiliency. It is easily yieldable to allow balancing element 21 to assume an eccentric position within sheath 23, in response to unbalanced centrifugal forces. Sheath 23, being centered with respect to the axis of the wheel, will always rotate concentrically with the wheel and tire assembly, but balancing element 21, being mounted for yielding shift in a radial direction, may assume any position to which it may be urged by the reactive components of vibration developed by an imbalance in the wheel and tire assembly, and the element 21 will automatically assume an eccentric position within sheath 23 such that the resulting imbalance will counteract the imbalance of the wheel assembly and thereby place the entire assembly of wheel, tire and balancing mechanism in dynamic rotating balance.

Compensating ring 21 may be formed of $5/16$ inch steel rod, formed to a circular ring and the ends welded or otherwise secured together to provide a continuous ring. Sheaf 23 may be a split tube of $1/16$ inch sheet steel of $3/4$ inch cross sectional diameter (outer diameter) and formed into a circular ring having a $16 1/4$ inch diameter to fit a conventional automobile wheel, or any variation in diameter such as to fit wheels having a different diameter.

In the fabrication of the balancer, a flat ring of $1/16''$ sheet stock may be first formed with a U-cross section, with the arms of the U parallel to the axis of the ring. The balancer ring 21 and cushion sleeve 22 may then be inserted therein.

The margins of sheath 23 are secured together by interlocking flanges 25 and 26, of barbed section having offset shoulders 27 which interengage to securely lock the sheath against expansion under the effect of centrifugal force. The locking takes place during the final forming operation on the sheath 23, in which the parallel portions of the partially formed sheath are curled around the assembly of compensating ring 21 and cushion sleeve 22.

Any one of a number of possible methods of assembling cushion sleeve 22 around ring 21 may be utilized in the fabrication of the balancer mechanism. One method which has proven to be feasible, is to cut from a sheet of sponge rubber an elongated rectangular blank, to roll the blank into tubular form and to adhesively join the edges thereof to form a straight sleeve. The ring 21, formed into a circular annulus but with its ends slightly separated, may then be fed into the sleeve (i. e., the sleeve be slipped over the ring) until the sleeve has its respective ends in equally spaced relation to the gap between the ends of the ring. By peeling the ends of the sleeve back from the respective ends of the ring 21 to leave projecting portions of the latter, the ends of ring 21 may be welded together, the ends of the sleeve 22 may then be brought together and adhesively secured.

Figure 5:
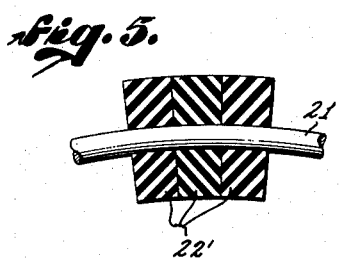
Fig. 5 is a fragmentary sectional view of a modified form of the insertion.
Figure 4:
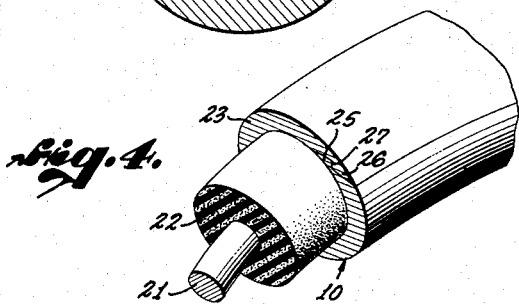
Fig. 4 is a perspective view of a fragmentary portion of the balancing mechanism.

As an alternative structure, sleeve 22' may consist in a series of doughnut-like rings of square cross-section, threaded onto ring 21 as indicated in Fig. 5. As an alternative method of fabrication, the sleeve 22 may be moulded around ring 21, as by pouring a liquid foam rubber solution into a suitable mold in which ring 21 is supported in a properly centered position, and thereafter curing the rubber.

Another possible method of manufacture is to insert rod 21 into the partially formed sheath, of U-section as mentioned above, to secure it by resilient supporting means, such as blocks of soft rubber inserted in a manner to block the ring 21 in the sheath in a centered position therein, then to pour foam rubber solution into the sheath and around ring 21, and then to cure the rubber while shaping its exposed surface to the desired circular cross section.

A still further possible method of fabrication is to first suspend the ring 21 in the partially closed sheath in the manner indicated above. Thereafter, the arms of the channel member may be curled into locking engagement with one another in a die, and, through a suitably drilled opening, the space within the sheath 23 may thereafter be filled with the sponge rubber solution. The assembled device will then be subjected to a suitable curing operation such as by subjecting it to heat, so as to cure the sponge rubber and provide a form retaining cushion sleeve surrounding the rod 21.

One of the advantages of the invention is the ease with which it can be attached to a wheel. Actually, it is possible to install the device by a "snap-on" action in which the device is simply laid against the rim 14 in the properly centered position, and the clips 16 then driven into place, using a suitable driving tool such as a hammer, in an operation in which the fingers 18 are driven between the tire bead 15 and rim flange 14. This provides for very rapid installation of the device, and when the shoulder portions 19 of the clips 16 are driven against the edge of rim 14, the device will be properly centered with reference to the axis of the wheel.

In operation, the metal rod 21 acts as a counterbalancing element which, during rotation of the wheel assembly, tends to assume a position diametrically opposed to any center of outwardly displaced weight in the wheel distribution. Thus, if a wheel is out of balance by being slightly heavier on one side of the center than on the other, the ring 21, at the other side of the center will tend to shift outwardly to match the imbalance on the opposite side of the wheel. This outward shifting of course takes place as the wheel rotates and in response to the vibrational effect of the imbalance of the wheel itself. Thus there is effected an automatic adjustment for any imbalance that may occur in the wheel, and the wheel will always rotate smoothly and in balance.

The invention can be embodied either in the attachment form shown and described above, or, alternatively, in a built-in form wherein the sheath 23 is constructed as an integral part of a vehicle wheel rim. In the latter case, the attachment clips 16 are of course eliminated.

I claim:

1. In a wheel balancing mechanism for a wheel including a rim having a lateral flange and a tire having a bead normally engaged against said flange by the inflation pressure thereof: a tubular sheath in the form of a circular torus; means for attaching said sheath to said rim; a tubular cushion sleeve of compressible material, of toroidal form, encased within said sheath and extending throughout the circumference thereof, and a compensating inertia ring of toroidal form enclosed within said cushion sleeve and adapted, in response to rotational imbalance in the wheel, to assume an eccentric position within said sheath counteracting said imbalance said cushion sleeve being of resilient compressible material normally maintaining said compensating ring in a centered position within said sheath and adapted to yield to allow said compensating ring to assume an eccentric position.

2. A device as defined in claim 1, wherein said attaching means comprises a series of clips each having a yoke portion to extend around said sheath and a finger portion attached to one end of said yoke portion and receivable between said rim flange and tire bead and clamped by the pneumatic pressure of the tire exerted through said bead.

3. A device as defined in claim 1, wherein said sheath is of sheet metal having a cross sectional shape of split ring form and having marginal flanges of barbed section, interlocking to avoid opening of the sheath under the effect of centrifugal force.

4. A device as defined in claim 1, wherein said cushion sleeve is integrally continuous throughout the toroidal circumference thereof.

5. A device as defined in claim 1, wherein said cushion sleeve comprises a series of washer elements encircling said compensating ring.

References Cited in the file of this patent

UNITED STATES PATENTS

| 2,070,995 | Mechling | Feb. 16, 1937 |
| 2,361,266 | Clark | Oct. 24, 1944 |
| 2,485,936 | Stroberg | Oct. 25, 1949 |

FOREIGN PATENTS

| 627,486 | France | June 11, 1927 |